United States Patent [19]
Besaw et al.

[11] Patent Number: 5,778,233
[45] Date of Patent: Jul. 7, 1998

[54] METHOD AND APPARATUS FOR ENABLING GLOBAL COMPILER OPTIMIZATIONS IN THE PRESENCE OF EXCEPTION HANDLERS WITHIN A COMPUTER PROGRAM

[75] Inventors: Keith Vernon Besaw, Saint Paul; Robert John Donovan, Rochester; Patrick Todd Haugen, Rochester; Mark Jonathon Hessler, Rochester, all of Minn.; Mikko Herman Lipasti, Pittsburg, Pa.; Robert Ralph Roediger, Rochester, Minn.

[73] Assignee: International Business Machines Corporation, Armonk, N.Y.

[21] Appl. No.: 729,609

[22] Filed: Oct. 11, 1996

[51] Int. Cl.[6] ........................................ G06F 9/45
[52] U.S. Cl. ...................... 395/709; 395/705; 395/708
[58] Field of Search ................................ 395/700, 705, 395/709, 708

[56] References Cited

U.S. PATENT DOCUMENTS

| | | | |
|---|---|---|---|
| 4,903,264 | 2/1990 | Talgam et al. | 371/16.1 |
| 4,922,414 | 5/1990 | Holloway et al. | 364/200 |
| 5,103,498 | 4/1992 | Lanier et al. | 395/68 |
| 5,222,221 | 6/1993 | Houri et al. | 395/375 |
| 5,241,635 | 8/1993 | Papadopoulos et al. | 395/375 |
| 5,265,254 | 11/1993 | Blasciak et al. | 395/700 |
| 5,276,881 | 1/1994 | Chan et al. | 395/700 |
| 5,278,985 | 1/1994 | Odnert et al. | 395/700 |
| 5,280,613 | 1/1994 | Chan et al. | 395/700 |
| 5,339,419 | 8/1994 | Chan et al. | 395/700 |
| 5,339,420 | 8/1994 | Hoxey | 395/700 |
| 5,347,653 | 9/1994 | Flynn et al. | 395/600 |
| 5,388,933 | 2/1995 | McKiel et al. | 434/118 |
| 5,642,512 | 6/1997 | Tanaka et al. | 395/705 |

OTHER PUBLICATIONS

Besaw, K. and Donovan, R.J., *IBM Technical Disclosure Bulletin* "Monotonically Increasing Counter for Local Code Optmization Algorithm", Dec. 1993, vol. 36 No. 12, pp. 663–668.

Helvig, J.D., et al. *IBM Technical Disclosure Bulletin*, "Exception Condition Sequencer" Sep. 1979, vol. 22 No. 4 pp. 1627–1634.

*Primary Examiner*—Alvin E. Oberley
*Assistant Examiner*—R. S. Rosenholm
*Attorney, Agent, or Firm*—Derek P. Martin; Martin & Associates, L.L.C

[57] ABSTRACT

A method and apparatus allows a compiler to optimize code in the presence of exception handlers. According to a first embodiment, arcs are added to a control flow graph, prior to performing global optimizations, to account for exception handling code. According to the second embodiment, information relating to control flow to exception handlers is provided in pseudo-references in the code, which allows the compiler to determine how to appropriately optimize the code.

14 Claims, 16 Drawing Sheets

```
        ...
        b = 3
        STORE b
        a = 12367
        STORE a
        i = 0
        STORE i
X:      LOAD b
        b = b + 7
        STORE b
        LOAD i
        i = i + 1
        STORE i
        LOAD i
        if i < d goto X
        LOAD b
        if b > 100 goto Y
        a = 5208
        STORE a
        goto Z
Y:      LOAD a
        b = a
        STORE b
Z:      LOAD a
        LOAD b
        call foo (a+b)
        a = 976
        STORE a
ResumePoint:
        LOAD a
        x = a
        ...
```

FIG. 4

```
        ...
        b = 3
        STORE b
        a = 12367
        STORE a
        i = 0
        STORE i
X:      LOAD b
        b = b + 7
        STORE b
        LOAD i
        i = i + 1
        STORE i
        LOAD i
        if i < d goto X
        LOAD b
        if b > 100 goto Y
        a = 5208
        STORE a
        goto Z
Y:      LOAD a
        b = a
        STORE b
Z:      LOAD a
        LOAD b
        call foo (a+b)
        a = 976
        STORE a
ResumePoint:
        LOAD a
        x = a
        ...
```

FIG. 5

```
int foo(int);
int bar(int);

int foo (int x)
{
        int a, b, c, d, i;

c = 10;
        d = 20;
1400
        try {
                b = 0;
                a = 0;
                for (i = 0;  i < 30; i++) {
                        a = a + 12;
                        b = b + 24;
                        x = bar(x);
1410            }
1420    }
        catch (...) {
                return  a + d;
        } c = 30 + x;

return c;
}
```

FIG. 14

```
                c = 10
                STORE c
                d = 20
1500            STORE d
      ╲──────── ENABLE EHANDLER
                b = 0
                STORE b
                a = 0
                STORE a
                i = 0
                STORE i
         A:
                LOAD i
                if i < 30 then jump to B
                LOAD a
                a = a + 12
                STORE a
                LOAD b
                b = b + 24
                STORE b
1510            LOAD x
      ╲──────── PSREF
                x = bar ( x )
                STORE x
                LOAD i
                i = i + 1
                STORE i
1520            goto A
      ╲   B:
       ╲─────── DISABLE EHANDLER
                LOAD x
                c = 30 + x
                STORE c
                LOAD c
                return  c
1530
      ╲── ResumePoint:
                LOAD a
1540            LOAD d
      ╲──────── return a + d
```

FIG. 15

```
                c = 10
                STORE c
                d = 20
                STORE d
                ENABLE EHANDLER
                b = 0
                STORE b
                a = 0
                STORE a
                i = 0
                STORE i
         A:
                LOAD i
                if i < 30 then jump to B
                LOAD a
                a = a + 12
                STORE a
                LOAD b
                b = b + 24
                STORE b
1510            LOAD x
                PSREF (live-in: a, d)
                x = bar ( x )
                STORE x                          1600
                LOAD i
                i = i + 1
                STORE i
                goto A
         B:
                DISABLE EHANDLER
                LOAD x
                c = 30 + x
                STORE c
                LOAD c
                return  c
1530
         ResumePoint:
                LOAD a
1540            LOAD d
                return a + d
```

FIG. 16

```
                1700      c = 10
                          STORE c
                          d = 20
                          STORE d
                          ENABLE EHANDLER
                          b = 0
                          STORE b
                          a = 0
                          STORE a
                          i = 0
                          STORE i
                   A:
                          LOAD i
                          if i < 30 then jump to B
                          LOAD a
                          a = a + 12
                          STORE a
                          LOAD b
                          b = b + 24
                          STORE b
                1710      LOAD x
                1720      STORE a
                          STORE d
                          PSREF (live-in: a, d)
                          x = bar ( x )
                          STORE x
                          LOAD i
                          i = i + 1
                          STORE i
                          goto A
                   B:
                          DISABLE EHANDLER
                          LOAD x
                          c = 30 + x
                          STORE c
                          LOAD c
                          return  c 1730   ResumePoint:
                1740         LOAD a
                             LOAD d
                          return a + d
```

FIG. 17

METHOD AND APPARATUS FOR ENABLING GLOBAL COMPILER OPTIMIZATIONS IN THE PRESENCE OF EXCEPTION HANDLERS WITHIN A COMPUTER PROGRAM

BACKGROUND OF THE INVENTION

1. Technical Field

This invention generally relates to computer systems. More specifically, this invention relates to a method and apparatus of allowing global compiler optimizations to be performed on a computer program that contains exception handling.

2. Background Art

The development of the EDVAC computer system of 1948 is often cited as the beginning of the computer era. These early computers were programmed by a technician manually entering machine language instructions and data into the computer line by line. Machine language instructions are the only thing the computer's processor understands. Any program that is to be run on a computer must eventually be reduced to low level machine language. As computer operating systems became more sophisticated, entire machine language programs could be entered into the computer at one time. Despite this improvement, the cryptic machine language made this process of writing and executing programs tedious, error prone, and inefficient.

Structured programming languages, like C, Fortran, and C++, were invented to overcome the problems of programming in low-level machine languages. They read more like a natural language to the human programmer. The programmer could write programs faster with these new languages, than with machine language. However, the computer's processor still only understood machine language. Compilers were written to bridge this gap between structured programming languages and machine language.

Compilers take a program written in a structured programming language as input (also called "source code"), and output it's equivalent as a machine language program (also called "object code"). In addition to translating a program from a modern programming language into machine language, compilers can also perform other functions. For example, they can also optimize the program so that it will run faster. Many optimizations depend on knowledge of the control flow of the program. Control flow is defined by the conditional and unconditional branches contained within the program instructions. Many global optimizations are based on control flow (see Alfred V. Aho et al., *Compilers, Principles, Techniques and Tools*, ch. 10, (1986)).

The presence of exception handlers in a program complicates compiler optimizations by making control flow difficult, if not impossible, to ascertain. An exception is an unexpected or exceptional condition that can occur during the execution of a program. Examples of exceptions are: divide by zero error, and arithmetic overflow. It is often impossible at compile time to determine which statements in a program will cause an exception. Transfer of control to an exception handler can potentially occur with many operations in the program. This transfer of control is not based on a conditional or unconditional branch in the program but rather a branch caused by an exception. The program control flow will not reflect these branches that could result from exceptions. Optimizations that depend on control flow will not account for these potential transfers of control to an exception handler. If an exception were to occur during the execution of the optimized code, the results would be unpredictable. To avoid this problem, one approach has been to limit the compiler from performing global optimizations that depend on control flow when exception handlers are present in the program. Exceptions occur rarely in the execution of a program. Forbidding compiler optimizations to guard against problems that rarely occur seems like a harsh solution. Without a method for allowing a compiler to optimize code in the presence of exception handlers, compiled code will not be as efficient as it would otherwise be, and will execute more slowly than optimized code.

DISCLOSURE OF INVENTION

According to the present invention, a method and apparatus allows a compiler to optimize code in the presence of exception handlers. According to a first embodiment, arcs are added to a control flow graph, prior to performing global optimizations, to account for exception handling code. According to the second embodiment, information relating control flow to exception handlers is provided in pseudo-references in the code, which allows the compiler to determine how to appropriately optimize the code.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 4 is a sample program in intermediate language form, with stores and loads to and from memory shown;

FIG. 5 is the program from FIG. 4 with arcs indicating conditional and unconditional branches;

FIG. 14 is a C++ program with an exception range and exception handler defined;

FIG. 15 (is an intermediate language representation of the C++ program in FIG. 14 showing the exception boundaries, pseudo reference, and exception handler resume point;

FIG. 16 is the program from FIG. 15 with the "live-in" information being passed back from the exception handler to the pseudo reference; and FIG. 17 is the program from FIG. 15 with some possible optimizations shown.

BEST MODE FOR CARRYING OUT THE INVENTION

OVERVIEW

The method and apparatus of the present invention has particular applicability to the field of compilers, and specifically to optimizations made by compilers on programs with exception handling routines. For those individuals who are not compiler experts, a brief overview of compilers and concepts relating to compiler optimizations are given.

Compilers

Computer programs are constructed using one or more programming languages. Like words written in English, a programming language is used to write a series of statements that have particular meaning to the drafter (i.e., the programmer). The programmer first drafts a computer program in human readable form (called source code) prescribed by the programming language. The programmer then uses mechanisms that change this human readable source code into a machine readable form (machine language program or object code) that can be understood by a computer's processor. These mechanisms are typically called compilers; however, it should be understood that the term "compiler", as used within this specification, generically refers to any mechanism that transforms one representation of a computer program into another representation of that program. This machine readable form, within this specification, is a stream of binary instructions (i.e., ones and zeros) that are meaningful to the computer's processor.

Figure 2:
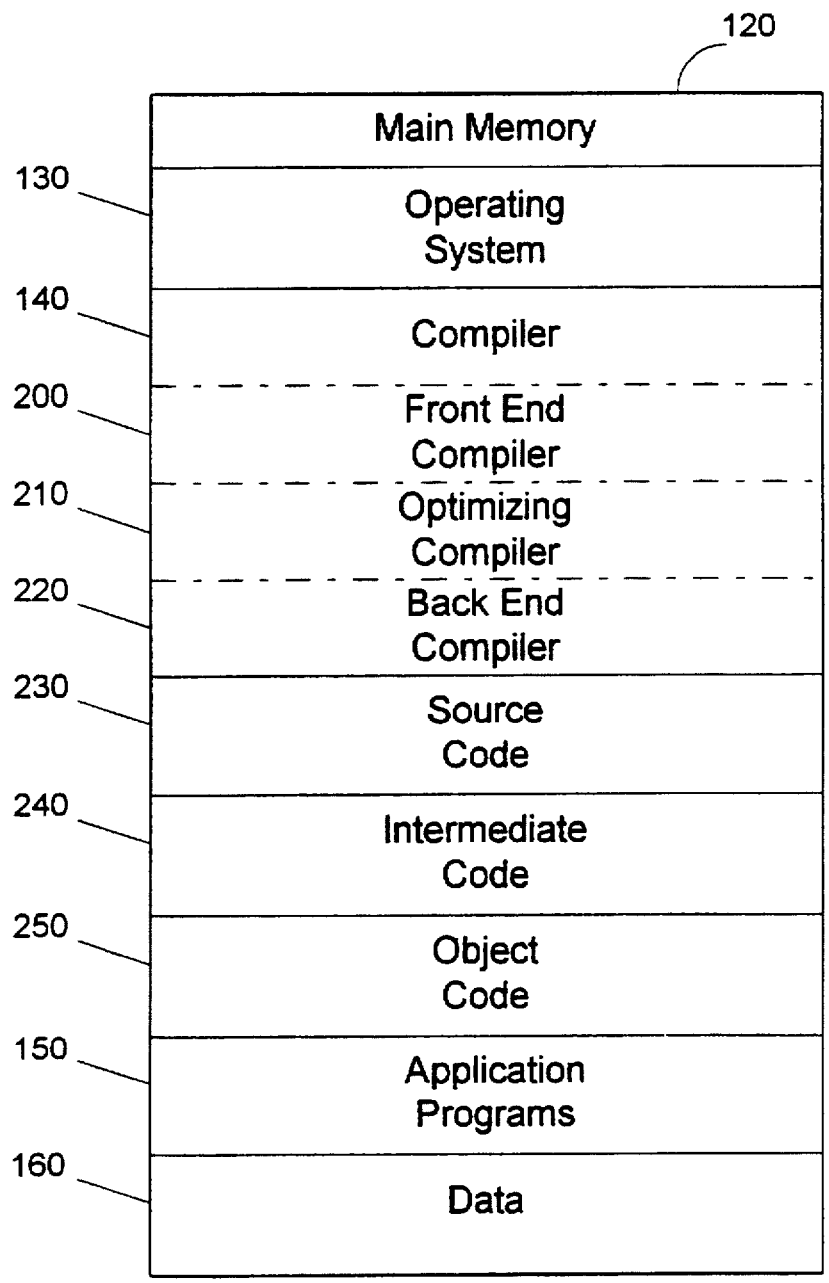
FIG. 2 is a detailed block diagram of the main memory of FIG. 1.
Figure 3:
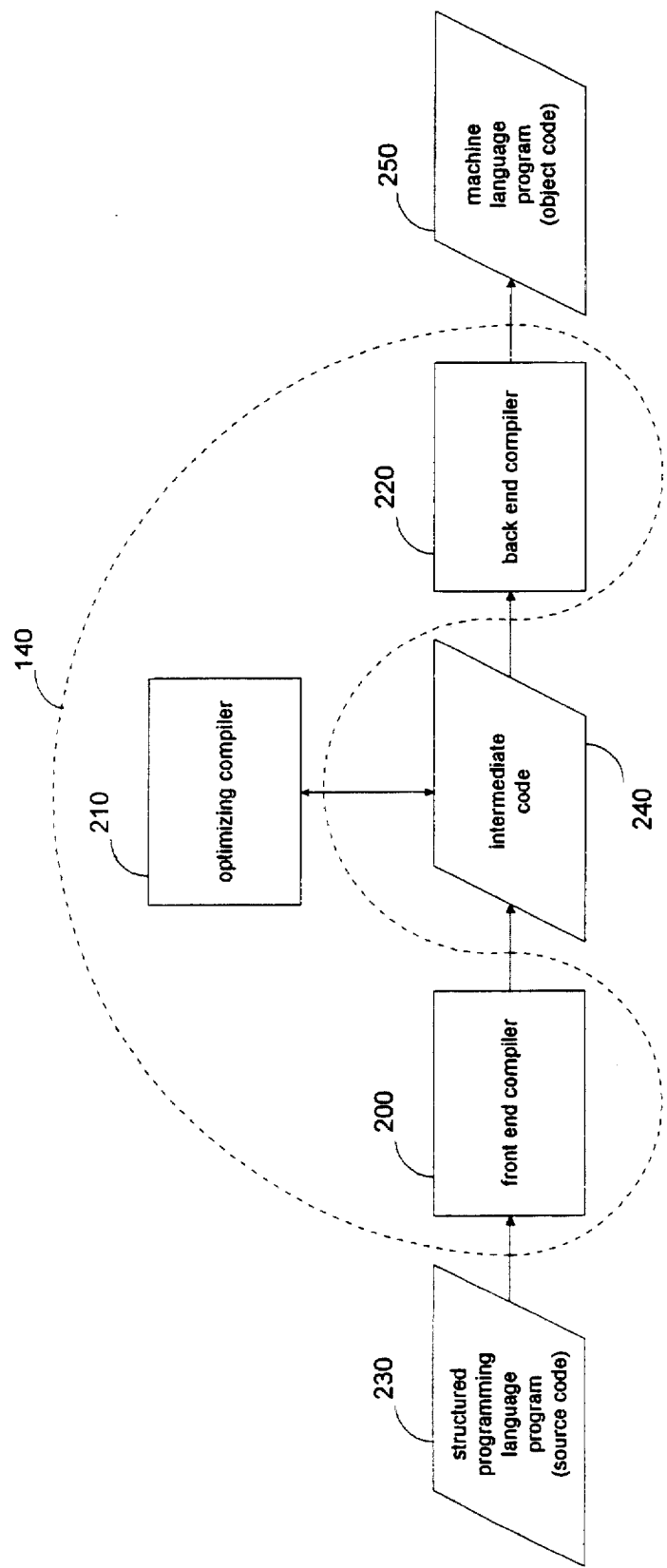
FIG. 3 is a flow diagram of the front end, back end, and optimizing parts of a compiler and the inputs and outputs to each.

The compiler typically compiles each programming language statement in the source code into one or more machine language instructions in the resulting object code. This is usually a two step process. Referring to FIGS. 2 and 3, the "front end" of the compiler 200 translates the source code statements 230 into one or more lower level intermediate language instructions 240. The "back end" of the compiler 220 then takes this intermediate language program 240 and translates it into a machine language program 250 that the computer's processor understands.

An optimizing compiler 210 preferably performs optimizations on intermediate code 240, though optimizations can be performed on the source or object code. While the front end compiler 200, optimizing compiler 210, and back end compiler 220 are shown in FIG. 3 as separate entities, one of ordinary skill will recognize that two or all three of these blocks may be implemented within a single compiler 140, as indicated by the dotted line 140 of FIG. 3.

A compiler may reside within the memory of the computer which will be used to execute the object code, or may reside on a separate computer system. Compilers that reside on one computer system and are used to generate machine code for other computer systems are typically called "cross compilers." The methods and apparatus discussed herein apply to all types of compilers, including cross compilers.

Optimization

Most compilers perform some optimizations on the program to make it run faster. Optimizations can take on many forms. Some examples of optimizations are: eliminating common sub expressions, eliminating dead code, using registers more efficiently, or optimizing loops. These optimizations can improve a program's efficiency, but they must not change the function that it performs. Compiler optimizations can be divided into two groups: local and global optimizations. To understand this distinction better, the concepts of basic blocks and flow graphs are discussed below.

Basic Blocks and Flow Graphs

Figure 6:
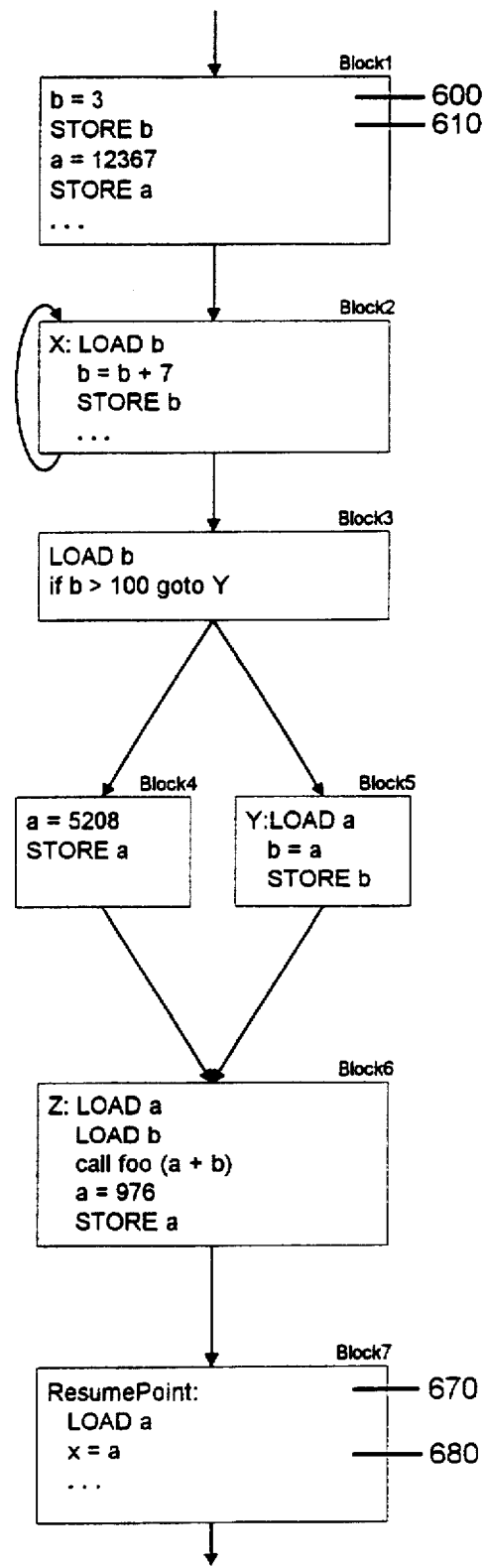
FIG. 6 is control flow graph of the program from FIG. 4.

Basic blocks and flow graphs are usually constructed from analyzing the control flow of the intermediate code representation of the program. FIG. 4 gives an example of a piece of intermediate language code. The symbols "a", "b" and "i" represent the registers that the variables "a", "b", and "i" are stored in. Stores and loads to and from memory of these variable values are also shown. In FIG. 5, control flow arcs have been added where conditional and unconditional branches are seen in the code. The places where the control flow arcs leave and enter the code define boundaries of the basic blocks, as shown in FIG. 6. A basic block is a sequence of consecutive statements in which flow of control enters only at the beginning and leaves only at the end of the block, without the possibility of branching except at the end of the block. Compiler optimizations that can be performed by looking only at statements within a single basic block are called local optimizations; optimizations across basic blocks are called global optimizations. The combination of basic blocks and control flow arcs constitute a flow graph (FIG. 6).

Live Variable, Live Ranges

Flow graphs furnish information to the compiler to help it make global optimizations on the program code. One piece of useful information which flow graphs provide is live variable analysis. Live variable analysis depends on the concepts of "definition" and "use" of a variable. A variable definition occurs when a program statement assigns a new value to a variable. A use of a variable means a program statement references the value of a variable. A variable's definition "reaches" a given point if there is path from the definition to the point and if the variable is not redefined on the path. A variable is "live" at a given point if there is a path from the point to a use of the variable and if the variable is not redefined on the path. Now to pair up definitions and uses, define the "live range" of a variable's definition as all points the definition "reaches" and where the variable is also "live". Note that the definition of a live range used herein is simplified for purposes of illustrating the concepts of the present invention. A "live range" may actually contain multiple definitions due to shared uses. Those skilled in the art are familiar with the concept of live ranges, and the simplified definition used herein shall not be construed as limiting the application of the present invention.

Figure 8:
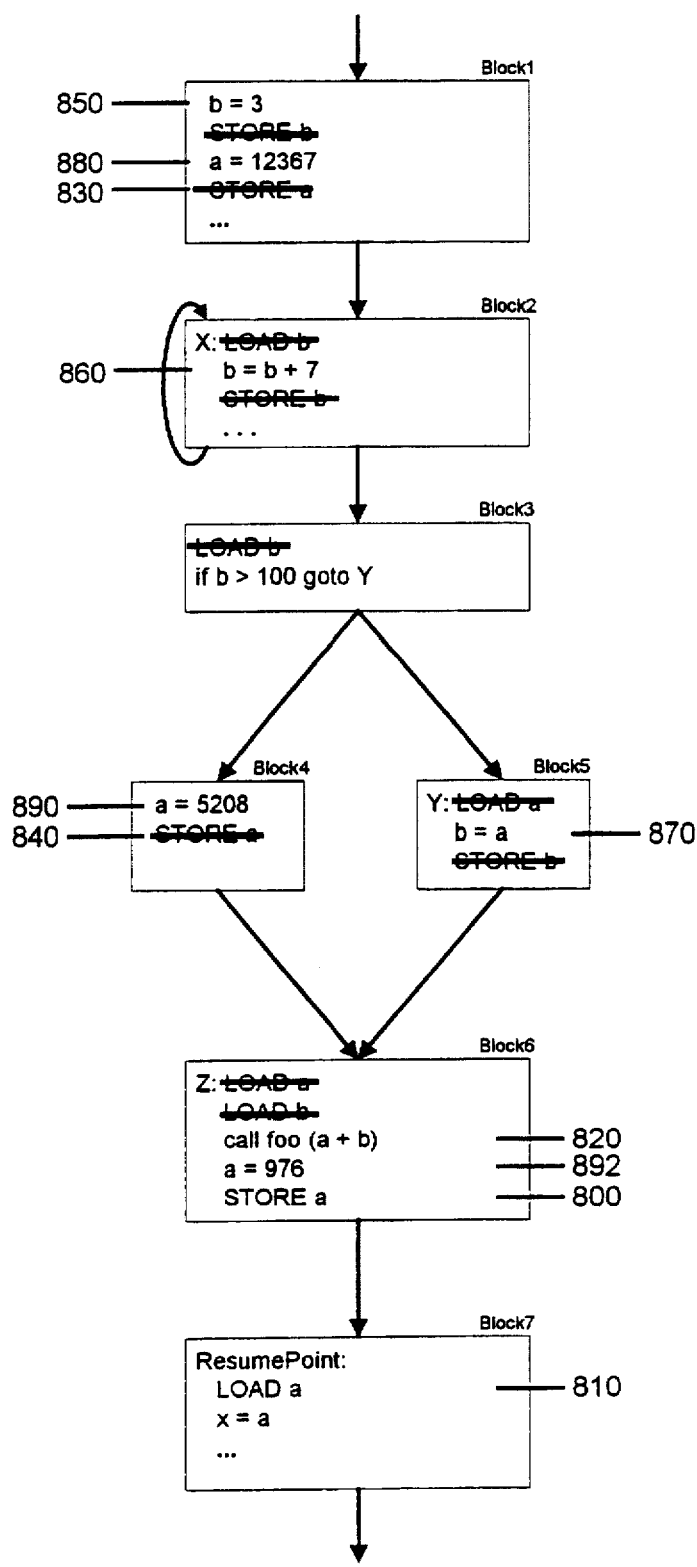
FIG. 8 is the control flow graph from FIG. 6 showing optimizations made to load and store instructions while ignoring the presence of an exception handler.

The concept of live ranges may be illustrated by referring to the flow diagram of FIG. 8, ignoring the instructions that are lined out (which will be discussed later). In FIG. 8, the variable "b" is defined in Block1 (see 850). This Block1 definition reaches into Block2 where it is used before being redefined in the same instruction (see 860). This new redefinition in Block2 starts a new live range for "b". The new Block2 definition of "b" reaches through Block3 and Block4 to Block6 where it is used (see 820). The Block2 definition of "b" does not reach through Block5 due to the redefinition of "b" in Block5 (see 870). The Block5 definition reaches into Block6 where it is used (see 820).

Live variable analysis helps make several global code optimizations. First, if a variable definition is found to have no uses below it, then the definition can be eliminated. This is known as dead code elimination. Another optimization can be made with register allocation. The CPU in a computer system works directly on data stored in its registers. It is expensive (timewise) to load a variable's value from memory into a register. It is also expensive to store a value from a register to memory. If a variable's live range is known then its definition can be kept in a register for the duration of its live range. All subsequent uses of that definition will not have to load the variable's value from memory, but instead can quickly access the value from a register. Of course, problems occur when there are more live variables, at certain points in the flow graph, than registers. Register allocation schemes attempt to solve this problem efficiently by choosing certain variables to store their value out to memory and not use a register. Loading and storing variables requires the insertion of "spill code" (i.e., load and store instructions) into the instruction stream that the compiler builds. The amount of spill code may be optimized by avoiding unnecessary loads and stores in the instruction stream. These optimizations (and others) depend on knowing the live ranges of variables, which can be derived from the flow graph.

Exceptions, Exception Handling, and Resume Points

Exception handling creates problems for the global optimizations that are derived from live variable analysis of flow graphs. An exception is an unexpected or exceptional condition that can occur during the execution of a program. Examples of exceptions are: divide by zero error, arithmetic overflow, or user defined exceptions such as the C++ "throw" instruction. Exceptions can be implicit or explicit.

Implicit exceptions occur as the result of performing operations in the programming language under unusual conditions. Examples are arithmetic overflow and divide by zero. Predefined exceptions may be implicitly raised by the program whenever the execution of a program statement causes one of these exceptional conditions to occur.

Explicit exceptions are defined by the programmer. The programming language must provide a mechanism to explicitly raise an exception. In C++ the "throw" construct is used to explicitly raise an exception.

Figure 7:
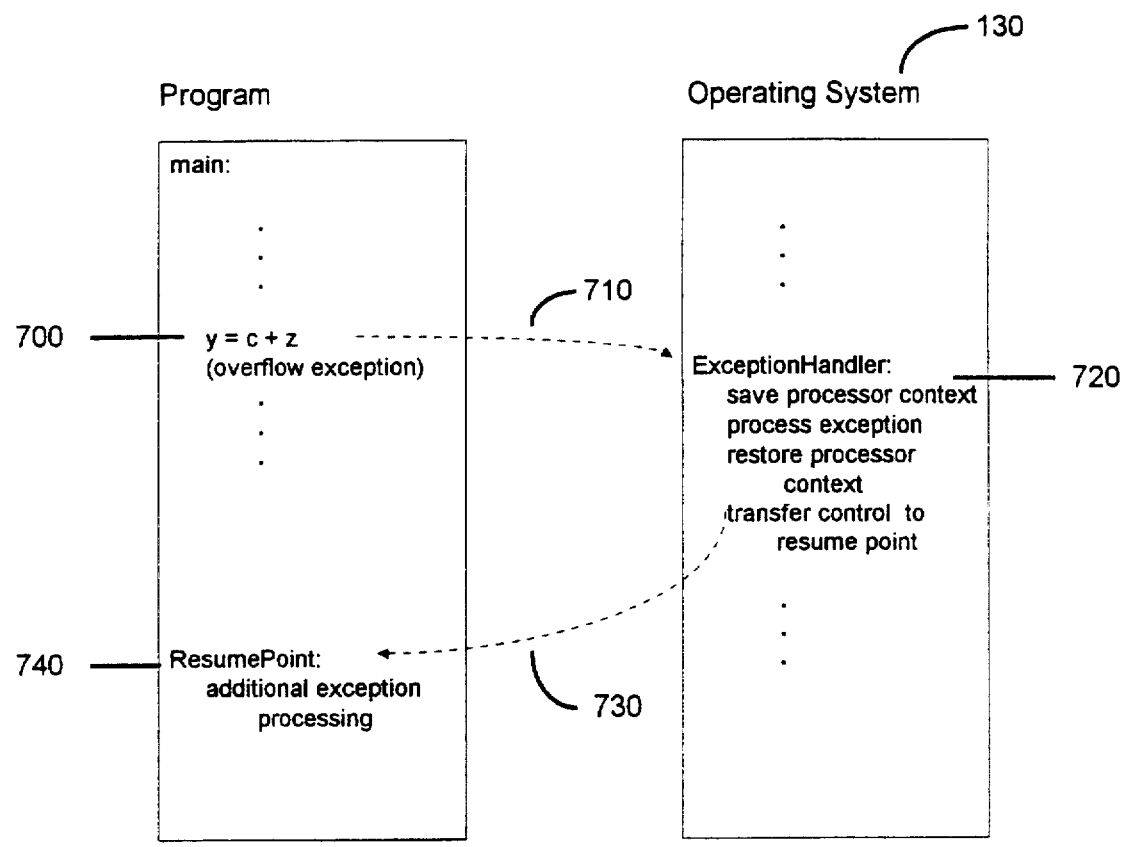
FIG. 7 is a diagram showing the interaction between a program and the operating system when an exception occurs.

After an exception is raised (see 700 in FIG.7), implicitly or explicitly, it may be "handled", ignored, or the program may immediately abort. Often the operating system 130 will first transfer control (see 710) over to its own exception handling routine (see 720). The processor context is saved when the transfer is made by storing some or all of the registers. When this routine is finished, the processor context is restored. This saving and restoring of the registers preserves the context that the program was running under, and allows the program to do its own exception handling cleanup as well. The operating system then has several options for its next step, depending on its implementation. Some of these options are to abort execution of the program; to return control to the next programming instruction following the operation that caused the exception condition; or to transfer control to a resume point (see 730). The resume point is a global label in the program that defines code that was written by the programmer to handle an exception (see 740). A program can have one or more resume points, which can each be used by one or more different exceptions and/or by different ranges of statements within the program. This code under the resume point is the program's own exception handling routine. It generally consists of additional exception processing which may include cleanup and eventual termination of the program. C++ has implemented resume point/exception handling with "catch" statements, which is part of the "try-catch" construct.

Some exception handling implementations allow the programmer to narrow the range of program code whose exceptions can be handled at the resume points. Exception boundaries are used to define this range. An exception occurring in code inside the exception range will be handled at a resume point, assuming a resume point was defined for that particular exception type. If an exception occurs outside this exception range, then the operating system alone will handle the error or the exception may be ignored. C++ implements this exception range technique with the try block, which is part of the "try-catch" construct.

Optimization Problems with Exceptions

Exception handler resume points within a program create optimization problems, especially when the exception is implicit. When flow graphs are constructed, control arcs are generally used to indicate locations where conditional and unconditional branches are seen in the program. Many operations in a program can cause an implicit exception to occur, resulting in an eventual jump to a resume point within the program that will handle the exception. This jump does not show up as a conditional or unconditional branch in the program. Therefore, a compiler that uses flow graphs will not draw a control flow arc for this potential branch. Code at the exception handler resume point may "use" variables whose "definition" was made earlier in the mainline program. This portion of the real "live range" for the variable definition (from the definition in the mainline program to its use in the exception handler) will not be reflected in the flow graph, so the flow graph will be essentially incorrect. Optimizations that use these flow graph live ranges will not be able to be run on programs with exception handlers because the incorrect flow graph may yield incorrect results.

FIG. 6 is an example of a pessimistic approach to optimizing intermediate code in the presence of exception handlers. This approach allows no optimization of register usage. Every time a variable's symbolic register is assigned a new value (see 600), that value must be immediately stored out to memory (see 610). No consideration is given to the possibility that a variable's definition may still be live and it's value still contained in a register. Despite the obvious execution speed disadvantages of this approach, it does solve the problem of how to deal with exception handlers. All variable definitions are always up to date in memory. So, whenever an exception occurs and a branch to the resume point of the exception handler is made, any variable that is referenced before being defined can be safely loaded from memory.

The method of FIG. 8 takes a somewhat opposite approach and considers live ranges of variables when optimizing intermediate code. FIG. 8 shows two distinct live ranges for variable "a". The definitions at 880 and 890 along with the uses at 870 and 820 comprise the first live range. All loads of "a" in this live range can be deleted and "a" can be kept in a register. It also appears from the flow graph that the stores to "a" (see 830 and 840) can be eliminated in this live range because "a" is redefined at 892 which appears to be the only flow out of the live range.

The second live range for "a" includes the definition at 892 and the use at 810. Because there is an unknown path into this live range (through the label ResumePoint), the "Load a" at 810 must remain. If the load remains then the store at 800 must also remain.

If an exception were to occur anywhere before the last remaining "Store a" (see 800) and a branch was made to the exception handler, then the value of "a" loaded from memory (see 810) would not be current. The problem is that a real execution flow out of the first live range is not reflected in the flow graph, so optimization incorrectly removed the stores to "a" (see 830 and 840). For this reason, compilers have generally taken the pessimistic approach of FIG. 6, requiring a store after each definition of a symbolic register and a load before each use when a resume point is present in the instruction stream.

Possible Solutions

Several solutions to the problem of optimizing in the presence of exception handling have been proposed. As discussed above, one is to not allow flow graph derived optimizations when exception handlers are present (see FIG. 6). This is an obviously harsh remedy to the problem since it will result in slower, unoptimized programs, for the sake of exceptions which rarely occur.

Another solution would be to determine all variables in the program's exception handling code that are referenced before they are defined. Then throughout the entire program force these variables to store to memory immediately when being defined or redefined, and force a reload from memory whenever they are referenced. Even with some minimal optimizations that remove unnecessary loads, this still results in a very severe remedy that will result in a slower program.

Control arcs could be drawn from every conceivable operation in the program that could cause an exception, to the resume point of the exception handler code. This would most likely result in an enormous, unwieldy flow graph that may not be practical to use for optimizations.

Mechanisms of Present Invention

The present invention overcomes this problem of optimizing in the presence of exception handlers by incorporating information about variable uses, that exist in the exception handler code, into the flow graph. With this information in the flow graph, global optimizations, which make use of the program flow graph, can now be made.

Detailed Description of Preferred Embodiments

Figure 1:
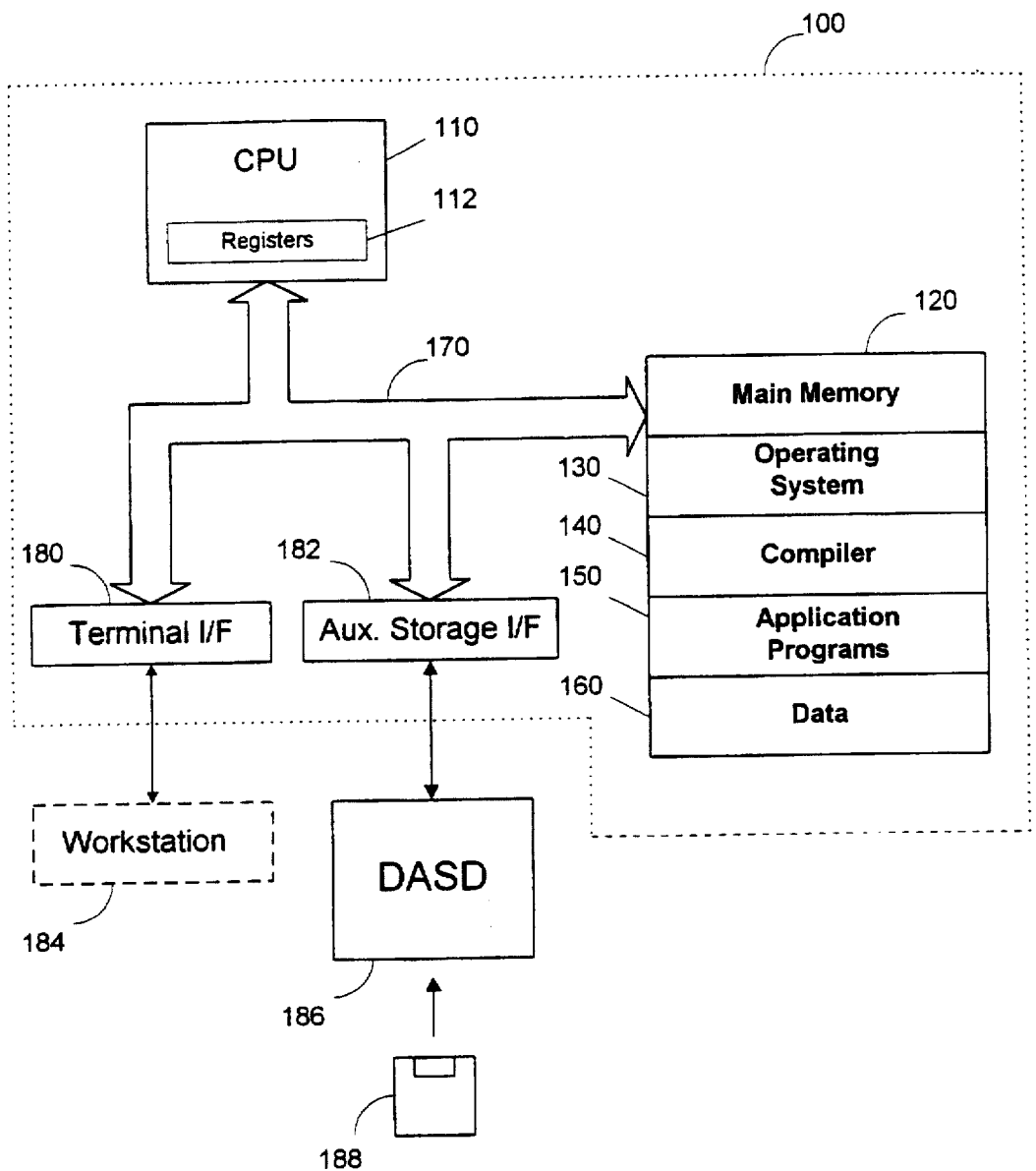
FIG. 1 is a schematic block diagram of a computer system in accordance with the present invention.

Referring to FIG. 1, a computer system 100 in accordance with the present invention is an enhanced IBM AS/400 mid-range computer system. However, those skilled in the art will appreciate that the mechanisms and apparatus of the present invention apply equally to any computer system, regardless of whether the computer system is a complicated multi-user computing apparatus or a single user device such as a personal computer or workstation. Computer system 100 suitably comprises a Central Processing Unit (CPU) 110, main memory 120, an auxiliary storage interface 182, and a terminal interface 180, all of which are interconnected via a system bus 170. Note that various modifications, additions, or deletions may be made to the computer system 100 illustrated in FIG. 1 within the scope of the present invention such as the addition of cache memory or other peripheral devices; FIG. 1 is presented to simply illustrate some of the salient features of computer system 100.

CPU 110 performs computation and control functions of computer system 100, and comprises a suitable central processing unit 110 (CPU) with several internal registers 112. The registers 112 within CPU 110 correspond to the "registers" discussed in the Overview section above. CPU 110 may comprise a single integrated circuit, such as a microprocessor, or may comprise any suitable number of integrated circuit devices and/or circuit boards working in cooperation to accomplish the functions of a central processing unit. CPU 110 suitably executes application programs 150 within main memory 120, and in response thereto acts upon information in physical registers 112.

Auxiliary storage interface 182 is used to allow computer system 100 to store and retrieve information from auxiliary storage, such as magnetic disk (e.g., hard disks or floppy diskettes) or optical storage devices (e.g., CD-ROM). One suitable storage device is a direct access storage device (DASD) 186. As shown in FIG. 1, DASD 186 may be a floppy disk drive which may read programs and data from a floppy disk 188. Note that an optimizing compiler in accordance with the present invention may exist as a program product on one or more floppy disks 188.

Terminal interface 180 allows system administrators and computer programmers to communicate with computer system 100, normally through programmable workstations 184. Although the system 100 depicted in FIG. 1 contains only a single main CPU 110 and a single system bus 170, it should be understood that the present invention applies equally to computer systems having multiple main CPUs and multiple system buses. Similarly, although the system bus 170 of the preferred embodiment is a typical hardwired, multidrop bus, any connection means that supports bi-directional communication could be used.

Main memory 120 contains operating system 130, compiler 140, application programs 150, and data 160. It should be understood that main memory 120 will not necessarily contain all parts of all mechanisms shown. For example, portions of application programs 150 and operating system 130 may be loaded into an instruction cache (not shown) for CPU 110 to execute, while other files may well be stored on magnetic or optical disk storage devices (such as DASD 186). In addition, compiler 140 may generate object code 250 that is intended to be executed on a different computer system if compiler 140 is a cross-compiler.

The remainder of this application describes how the present invention overcomes the problem of optimizing in the presence of exception handlers by incorporating information about variable live ranges, that exist in the exception handler code, into the program flow graph. Those skilled in the art will appreciate that the present invention applies equally to any compiler.

First Embodiment

The first embodiment is a method 900 that adds arcs to the flow graph of a program so that live ranges that exist across a jump to an exception handler can be accurately computed. It takes as input a control flow graph for a program. Referring to the flowchart of FIG. 9, the exception handler code is initially examined (step 905) to identify all exception handlers in the program. An exception handler is selected (step 915), and the "live-in" set for the selected exception handler is computed (step 920). The "live-in" set includes all variables that are live on entry to the exception handler code (i.e., that are live on entry at the Resume Point). A variable is live on entry, or "live-in" if, within the exception handler code, a variable is used before it is defined.

Assuming the live-in set is not empty, an arc is added to the control flow graph from each exit of the exception range to the Resume Point (step 925). At this point, if the live-in set is empty (step 930=NO), the program is checked to determine if any other exception handlers need to be processed (step 910). However, if the live-in set is not empty (step 930=YES), one of the variables in the live-in set is selected (step 935), and all definitions of that variable within the exception range are identified (step 940). These definitions must be within the scope of visibility of the exception handler. In other words, the exception handler must be able to be called from the part of the program where the definition is found. Assuming there is at least one definition of the selected variable (step 945=YES), a definition is selected (step 950), and an arc is added to the control flow graph from just before the definition to the Resume Point (step 955).

Next, the block containing the definition is split, if necessary (step 960). For example, if the added arc is in the middle of a basic block, the block will need to be split so that the new arc will not create a potential jump from the middle of a basic block. Those skilled in the art are familiar with the concepts related to splitting basic blocks.

Figure 9:
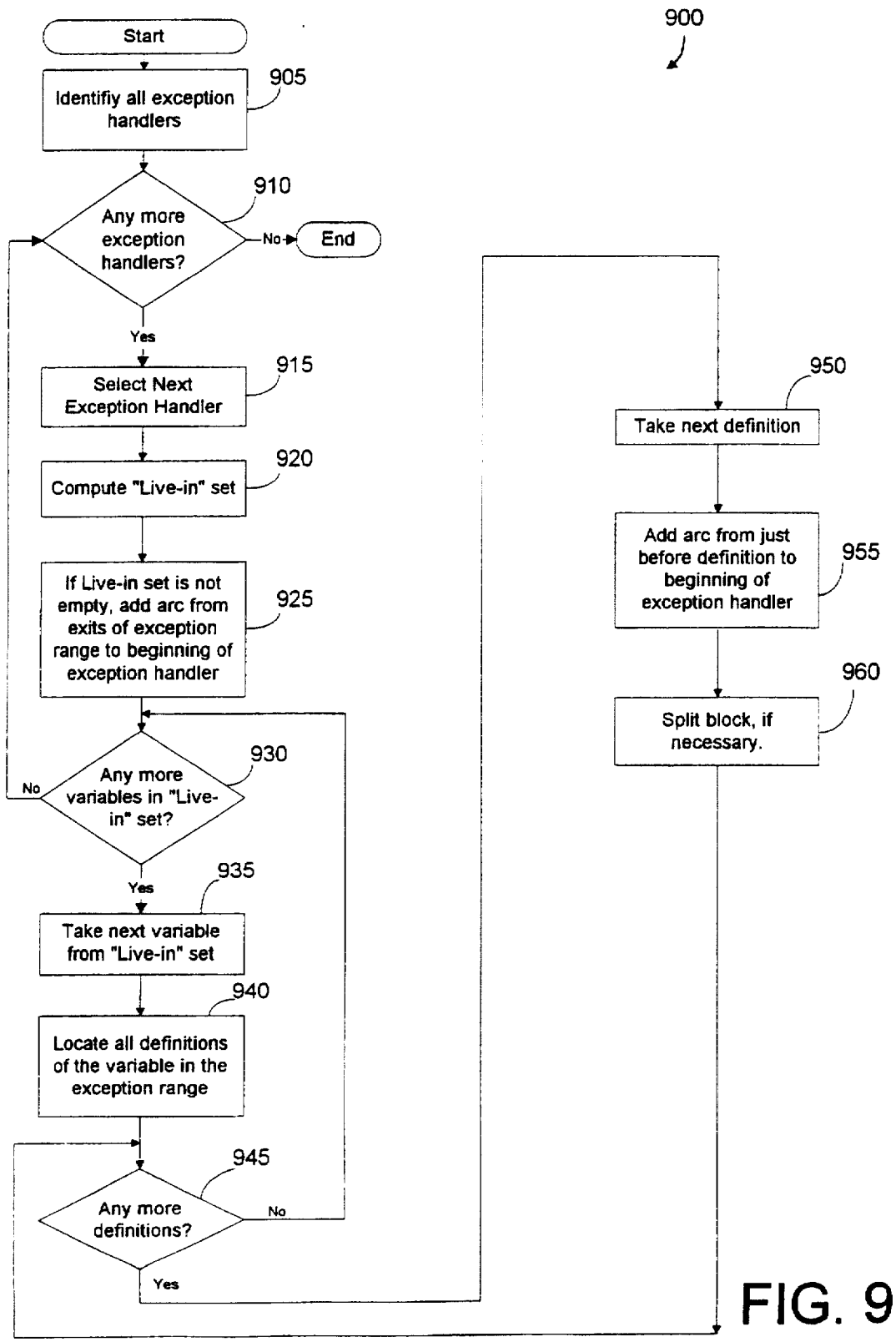
FIG. 9 is a flow diagram of a method to add flow arcs to a program's control flow graph to indicate live variable ranges that exist in the program's exception handler.
Figure 10:
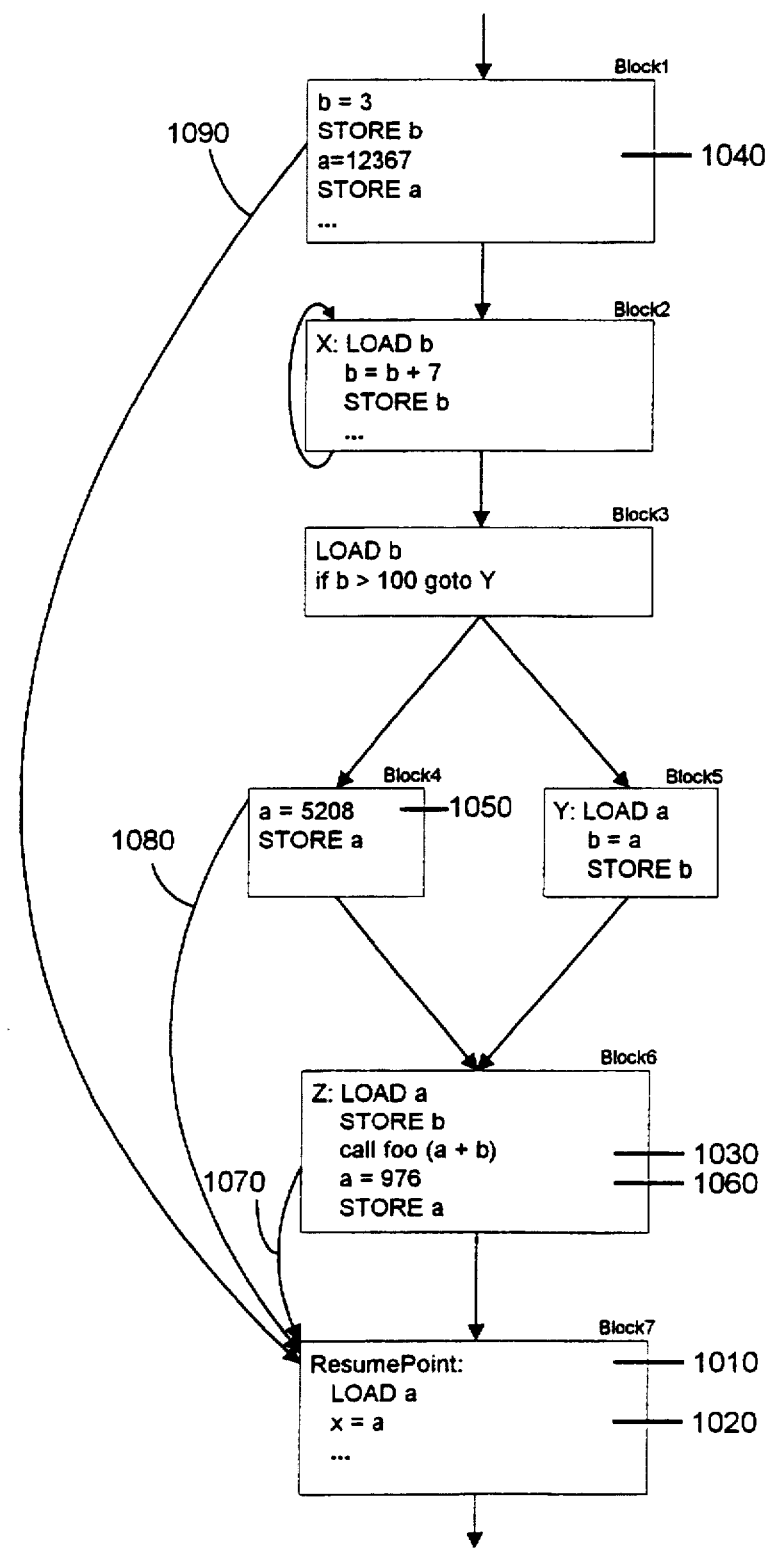
FIG. 10 is the control flow graph from FIG. 6 with new flow arcs that have been added after applying the method outlined in FIG. 9.
Figure 11:
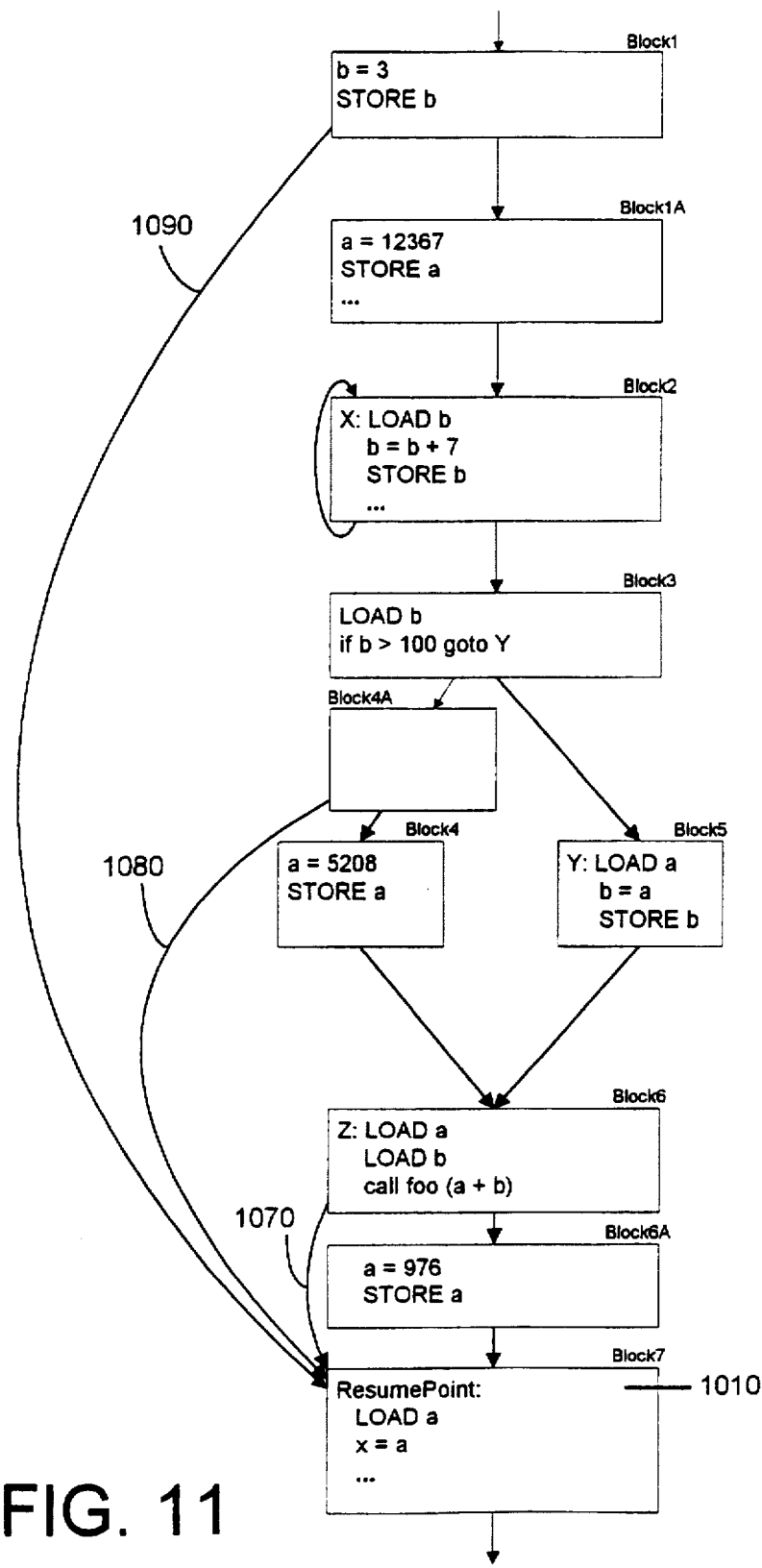
FIG. 11 is the control flow graph from FIG. 10 with new basic blocks formed as a result of new flow arcs being added.

FIG. 6 is a flow graph with an exception handler present (see 670). The method of FIG. 9 can be applied to the flow graph in FIG. 6, resulting in the flow graph seen in FIGS. 10 and 11. Referring to FIGS. 9 and 10, the first step of method 900 is to identify all exception handlers (step 905). For the program depicted by the flow graph of FIG. 6, there is only one exception handler defined at ResumePoint 670. This exception handler is selected (step 915), and the live-in set is computed (step 920). For the program of FIG. 6, the live-in set is assumed to be variable "a", since it is used (in instruction 680) before it is defined. An arc from the exit of the exception range to the exception handler is already present (i.e., the normal flow from Block6 to Block7) and so does not need to be added in step 925. Variable "a" is still in the live-in set and has not been processed (step 930= YES), so variable "a" is selected (step 935). Next, all definitions of "a" in the exception range are located (step 940). These definitions of "a" include instructions 1040, 1050 and 1060. One of these definitions is selected, and for illustration we assume the definition of "a" at instruction 1040 is selected first (step 950). An arc 1090 is added to the control flow graph from just before the definition of "a" to ResumePoint 1010. Since the arc creates a branch in the middle of a basic block, Block1 will be split (step 960) into Block1 and Block1A as shown in FIG. 11. Assuming the definition of "a" in instruction 1050 is selected next (step 950), an arc 1080 is added to the control flow graph from just before the definition of "a" to ResumePoint 1010, and Block4 is split (step 960) into Block4A and Block4. Note that one skilled in the art will realize that the addition of Block4A may be unnecessary. Finally, the last definition of "a" at instruction 1060 is selected (step 950), and arc 1070 is added (step 955), and Block6 is split into Block6 and Block6A (step 960). At this point there are no more definitions of "a" to process (step 945=NO), there are no more variables in the live-in set (step 930=NO), and there are no more exception handlers (step 910=NO), so method 900 ends. Note that FIG. 10 represents a flow diagram with the arcs added, but without any block splitting. FIG. 11 illustrates the completed flow graph with block splitting (step 960).

Figure 12:
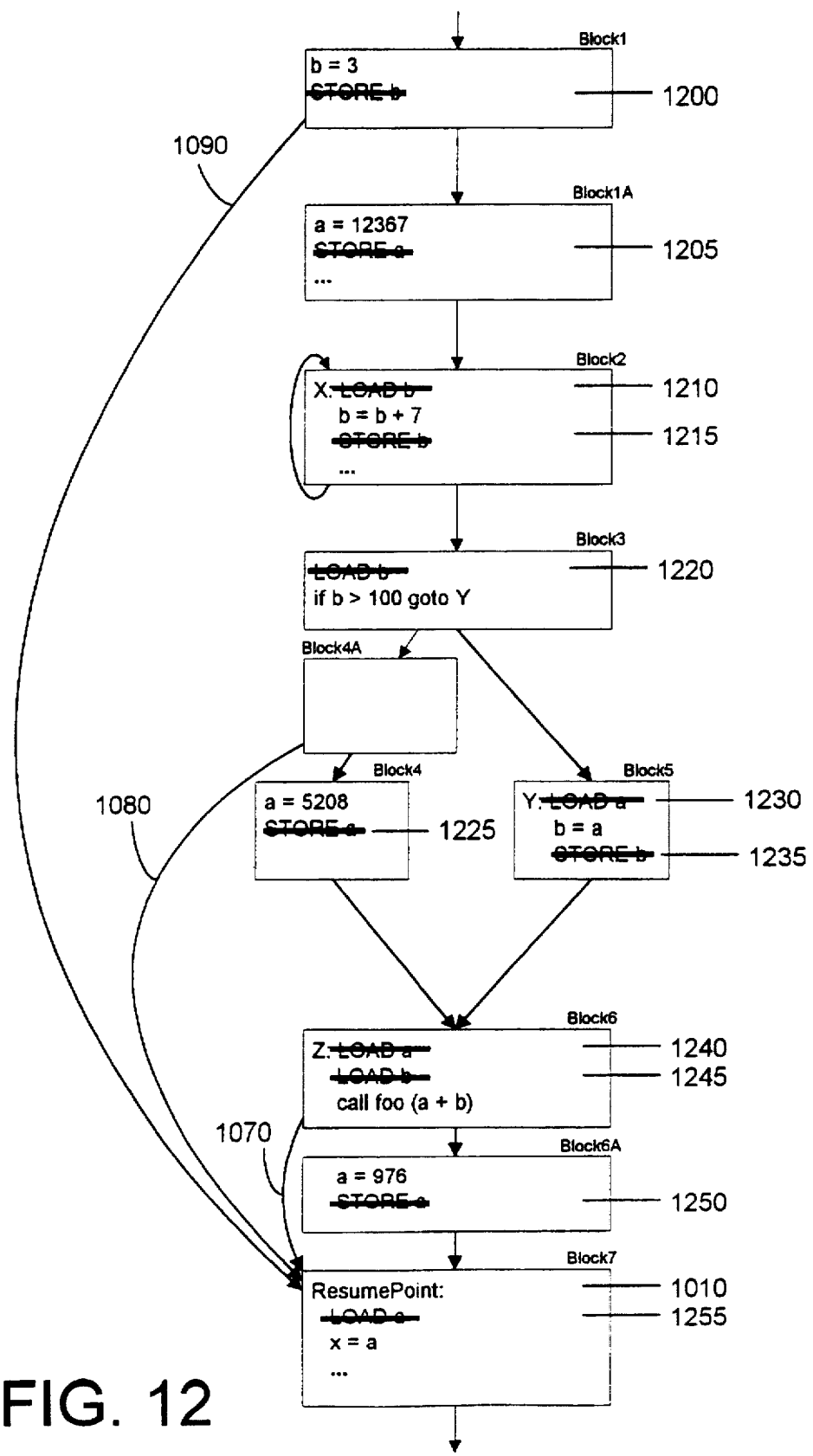
FIG. 12 is the control flow graph from FIG. 11 after optimizations have deleted unnecessary stores and loads to and from memory, while taking into account the presence of the exception handler.

The optimizing compiler takes the unoptimized flow graph in FIG. 11 as input and will perform optimizations that result in the optimized flow graph in FIG. 12. All of the load and store instructions for "a" in the example of FIG. 12 can be optimized away (see 1205, 1225, 1230, 1240, 1250, 1255). These optimizations may occur because the liveness of "a" on entry to the exception handler (i.e., at ResumePoint 1010) is reflected by the control flow arcs 1070, 1080, and 1090. All of the LOADs and STOREs of "b" can be optimized away since "b" is not part of the "live-in" set of the exception handler (see 1200, 1210, 1215, 1220, 1235, and 1245).

The method of FIG. 9 has given a flow graph which allows a great amount of optimization to be accomplished while protecting the integrity of the "live-in" variables of the exception handlers. With live variable, use, and definition information flowing to and from the exception handler code, global optimizations will accurately optimize across the transfer of control to the exception handler code.

Second Embodiment

This second embodiment details a specific way to implement the invention without explicitly adding arcs to the control flow graph. This method feeds back "live-in" variable information from the exception handling code to the code that is exception enabled. This method is outlined in FIG. 13.

Figure 13:
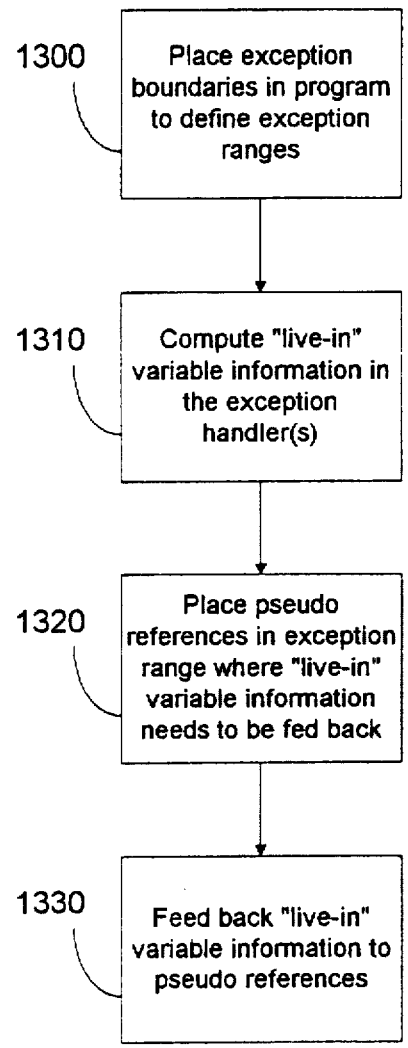
FIG. 13 is a flow diagram of a method to feed back "live-in" information from an exception handler to the exception range in the main program.

The exception boundaries must first be placed in the program code (see 1300 in FIG. 13). Exception boundaries define the exception ranges that exist in the program. If an exception occurs inside an exception range then it will be handled by the program's exception handler. Exceptions occurring outside this range will be handled exclusively by the operating system, and will not be handed over to a program defined exception handler. These exception boundaries can also specify which specific exceptions are enabled for a range. A programmer can explicitly place the exception boundaries in the program code, or it can be done by the front end of the compiler.

These exception boundaries can also act as a type of "firewall" in the code. Compiler optimizations can have the effect of moving the program code. If a program instruction has the potential of causing an exception that has been enabled then it cannot be moved across the exception boundary, in or out of the exception range.

After the exception ranges have been defined, the "live-in" variables for each exception handler are computed (see 1310). These live-in variables are program variables that are used in the exception handler code before they are defined. Information about these "live-in" variables will be fed back to the main program so that the compiler can perform optimizations with knowledge of the "live-in" variables.

"Live-in" variable information is fed back to operations in the main program called pseudo references. The placement of the pseudo references in the intermediate language code depends on the higher level language that is being implemented and on the optimizations to be performed. A pseudo reference should be placed before code that could cause an enabled exception. They can be placed by the programmer or by the compiler. After pseudo references are placed (see 1320) "live-in" variable information can be fed back to them in the main program from the exception handlers (see 1330). This feeding back information about "live-in" variables to the pseudo references in the main program is similar to drawing the control flow arcs in the method of the first embodiment (see 925 and 955 in FIG. 9). With this "live-in" variable information available at the pseudo references, the compiler will now be able to take into account the live ranges that exist upon entry into the exception handlers when making optimization decisions.

The steps of computing the "live-in" variables and placing the pseudo references can be done in any order (see 1310 and 1320). Both steps can be repeated for each exception handler.

FIG. 14 is a simple C++ program which defines an exception range and exception handler with a try-catch construct. All statements bracketed within the try statement are within the exception range (see 1400, 1410). The catch statement defines the exception handler (see 1420). In a try-catch construct, an exception must be explicitly signaled using the "throw" statement. There is no throw statement at the top level of this program, but function "bar" is assumed to contain a throw statement.

FIG. 15 is an intermediate language representation of FIG. 14. The steps of the method of this second embodiment (FIG. 13) will be applied to this intermediate language program. In the first step (see 1300), an exception range is defined by exception boundaries (see 1500, 1520). The exception handler is given a resume point label (see 1530). In the second step (see 1310), the "live-in" variables in the exception handler are computed. In this example variables "a" and "d" (see 1540) are used in the exception handler before ever being defined in the exception handler, so they qualify as live-in variables. In the third step (see 1320), a pseudo reference (or PSREF) is placed before the call to the function "bar". It is placed here because the function "bar" is potentially the only place in the program where a "throw" statement may be executed (we can't see down into function bar at this point, so we take the worst case precaution and assume it will ). Finally (see 1330) information about the live-in variables is passed back to the PSREF (see 1600 in FIG. 16). Now the compiler can use this live-in variable information in its optimizations on the program.

The placement of the PSREF depends greatly upon the language being implemented and the optimizations being performed. Wherever it would be advantageous for the optimizing compiler to know about "live-in" variables, a PSREF may be placed in order for the "live-in" variable information to be fed back from the exception handlers.

A quick look at the program (see FIG. 17) will reveal several optimizations that can be made. The definition of the variable "c" at the top of the program (see 1700) can be thrown away since it is never used. Most of the loads and stores to memory can also be done away with by store elimination algorithms. Stores of "a" and "d" must be added before the PSREF (see 1710, 1720) since these variables are part of the "live-in" set. The loads of "a" and "d" at the resume point must remain because they are "live-in" variables in an exception handler (see 1730, 1740). Other optimizations may be possible in this program. No optimizations would be allowed anywhere in the entire program if the compiler had no way to account for the "live-in" variables of the exception handler(s). The second embodiment provides a way to account for them during compiler optimizations.

It is important to note that while the present invention has been (and will continue to be) described in the context of a fully functional computer system, that those skilled in the art will appreciate that the mechanisms of the present invention are capable of being distributed as a program product in a variety of forms, and that the present invention applies equally regardless of the particular type of signal bearing media used to actually carry out the distribution. Examples of signal bearing media include: recordable type media such as floppy disks and CD ROMs and transmission type media such as digital and analog communications links.

While the invention has been particularly shown and described with reference to preferred embodiments thereof, it will be understood by those skilled in the art that various changes in form and details may be made therein without departing from the spirit and scope of the invention.

We claim:

1. A computer apparatus comprising:
    (A) an optimizer for optimizing a first instruction stream that is used to generate a second instruction stream, the first instruction stream being generated by a compiler and comprising a plurality of variables, the optimizer including:
        an exception range determiner, the exception range determiner determining at least one exception range of the first instruction stream during which at least one exception may occur;
        a resume point identifier, the resume point identifier identifying at least one resume point within the first instruction stream, each resume point identifying a range of at least one instruction that is executed when the at least one exception occurs;
        a live range calculator, the live range calculator determining the liveness of the plurality of variables, the liveness of a selected variable that is used in the at least one instruction in the exception handling range defined by a resume point before the selected variable is defined extending to at least one instruction within the at least one exception range defined by the exception range determiner; and
    (B) a CPU, the CPU executing the second instruction stream.

2. The computer apparatus of claim 1 wherein the compiler includes the optimizer.

3. The computer apparatus of claim 1 wherein the first instruction stream comprises an intermediate language instruction stream, and wherein the second instruction stream comprises a machine code instruction stream.

4. A computer apparatus for generating a second instruction stream from a first instruction stream, the second instruction stream being executable on a processor having a plurality of registers, the first instruction stream having a plurality of variables, the computer apparatus comprising:
    an optimizer for optimizing the first instruction stream, the optimizer including:
        an exception range determiner, the exception range determiner determining at least one exception range of the first instruction stream during which at least one exception may occur;
        a resume point identifier, the resume point identifier identifying at least one resume point within the first instruction stream, each resume point identifying a range of at least one instruction that is executed when the at least one exception occurs; and
        a live range calculator, the live range calculator determining the liveness of the plurality of variables, the liveness of a selected variable that is used in the at least one instruction in the exception handling range define by a resume point before the selected variable is defined extending to at least one instruction within the at least one exception range defined by the exception range determiner.

5. The computer apparatus of claim 4 wherein the compiler includes the optimizer.

6. The computer apparatus of claim 4 wherein the first instruction stream comprises an intermediate language instruction stream, and wherein the second instruction stream comprises a machine code instruction stream.

7. The computer apparatus of claim 4 wherein the first instruction stream comprises a first intermediate language instruction stream, and wherein the second instruction stream comprises a second intermediate language instruction stream.

8. A program product comprising:
    (A) an optimizer, the optimizer being used on a computer apparatus to optimize an instruction stream, the instruction stream having a plurality of variables, the optimizer including:
        an exception range determiner, the exception range determiner determining at least one exception range of the instruction stream during which at least one exception may occur;
        a resume point identifier, the resume point identifier identifying at least one resume point within the instruction stream, each resume point identifying a range of at least one instruction that is executed when the at least one exception occurs; and a live range calculator, the live range calculator determining the liveness of the plurality of variables, the liveness of a selected variable that is used in the at least one instruction in the exception handling range defined by a resume point before the selected variable is defined extending to at least one instruction within the at least one exception range defined by the exception range determiner; and (B) signal bearing media bearing the optimizer.

9. The program product of claim 8 wherein the signal bearing media comprises recordable media.

10. The program product of claim 8 wherein the signal bearing media comprises transmission media.

11. A method for optimizing an instruction stream having a plurality of variables, the method comprising the steps of:

determining at least one exception range of the instruction stream during which at least one exception may occur;

identifying at least one resume point within the first instruction stream, each resume point identifying a range of at least one instruction that is executed when the at least one exception occurs; and determining the liveness of the plurality of variables, the liveness of a selected variable that is used in the at least one instruction in the exception handling range defined by a resume point before the selected variable is defined extending to at least one instruction within the at least one exception range.

12. The method of claim 11 wherein the step of determining the liveness of the plurality of variables includes the steps of:

determining a set of the plurality of variables that are live at the at least one resume point;

locating all definitions of the set of variables within the at least one range;

adding a control flow arc from at least one exit of the at least one range to the at least one resume point; and adding a control flow arc just prior to the definition of a selected variable to each of the resume points that contain a use of the selected variable before the selected variable is defined.

13. The method of claim 12 further including the step of:

splitting at least one basic block containing the definition of the selected variable into a plurality of basic blocks if the step of adding the control flow arc results in control flow potentially branching from the middle of the at least one basic block.

14. The method of claim 11 wherein the step of determining the liveness of the plurality of variables includes the steps of:

determining a set of the plurality of variables that are live at the at least one resume point;

locating all definitions of the set of variables within the at least one range; and inserting at least one pseudo-reference into the instruction stream that defines which of the plurality of variables have uses before being defined in the exception handling ranges of instructions defined by resume points corresponding to exceptions that may occur in the at least one exception range; the at least one pseudo-reference comprising a directive to an optimizer that performs the optimization of the instruction stream.

* * * * *